United States Patent Office 3,428,846
Patented Feb. 18, 1969

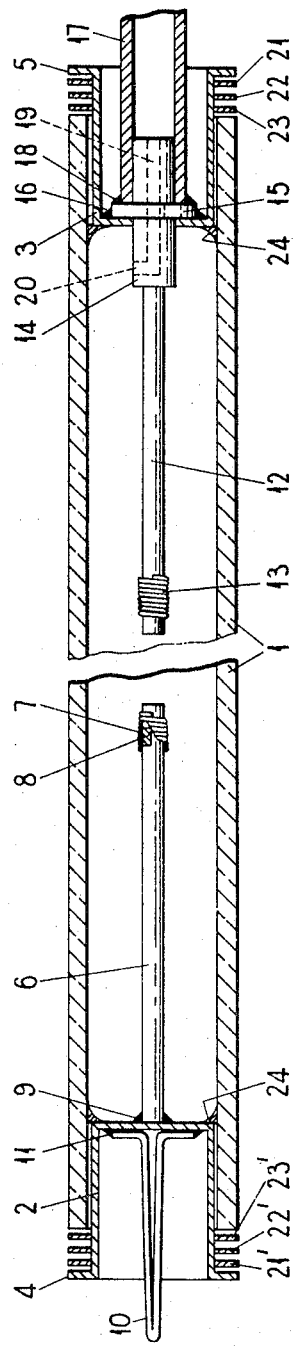

3,428,846
CLOSURE OF TUBES OF REFRACTORY
OXIDE MATERIAL
Sydney A. R. Rigden, Bushey Heath, and John B. Whiscombe, Ealing, London, England, assignors to The General Electric Company Limited, London, England, a British company
Filed Dec. 30, 1965, Ser. No. 517,737
Claims priority, application Great Britain, Jan. 7, 1965, 741/65
U.S. Cl. 313—284             1 Claim
Int. Cl. H01j 1/96

ABSTRACT OF THE DISCLOSURE

An open end of a refractory oxide tube is closed by inserting within the tube a closely fitting hollow cylindrical closure member formed of refractory metal having a coefficient of thermal expansion closely matching that of the tube material, the closure member being closed at the inner end and having at its outer end a flange overlying the end surface, and possibly part of the outer surface, of the tube wall, and forming a hermetic seal only between the flange and that portion of the tube wall which it overlies. The method is applicable to the closure of tubular alumina envelopes of alkali metal vapour electric discharge lamps, using niobium closure members and a bonding medium consisting of at least one of the metals titanium, zirconium, vanadium, hafnium, possibly with niobium and/or beryllium.

---

This invention relates to the end closure of tubes formed of material composed of one or more refractory oxides. The invention also relates to devices which include a tube of such material, especially electric discharge devices having discharge envelopes of the kind comprising a tube of such material, wherein at least one end of the said tube is closed by the method described.

The invention is more particularly, but not exclusively, concerned with electric discharge lamps of the kind comprising a tubular discharge envelope formed of light-transmissive refractory oxide material, and especially with such lamps having a discharge envelope of light-transmissive high alumina content material, that is to say light-transmissive refractory oxide material having an alumina content exceeding 85% by weight, and containing a filling which consists of or includes alkali metal vapour, for example sodium vapour. The said high alumina content material is highly resistant to attack by hot alkali metal vapour, and it has been proposed to form the discharge envelopes of alkali metal vapour electric discharge lamps from such material, especially from tubes of light-transmissive, sintered, polycrystalline alumina, possibly containing small additions of one or more other refractory oxides, for example up to 1% of magnesia. It has also been proposed to close the ends of such lamp envelope tubes by means of closure members in the form of caps or discs, formed of a suitable refractory metal such as niobium, which are placed over and sealed to the ends of the alumina tube; the lamp electrodes, which are usually disposed at each end of the tube and along the axis of the tube, are then each supported by one of the said end closure members, either by means of a support member sealed through the closure member or by direct sealing of the electrode through the closure member.

In use of an alkali metal vapour electric discharge lamp of the kind referred to, the metal contained in the envelope for providing the vapour filling in operation condenses in the coolest regions of the envelope, which are normally the regions at the ends of the envelope tube, in the vicinity of the seals between the tube and the end closure members. Therefore, in the manufacture of the lamp, the relative dimensions of the envelope tube and the electrodes must be so adjusted that, in operation, these regions of the envelope are heated to a sufficiently high temperature to ensure that the required operating vapour pressure of the alkali metal is maintained, the temperature of the said coolest regions of the envelope being controlled by the length of the electrode extending into the envelope, in relation to the diameter of the envelope tube. For example, in the case of a high pressure sodium vapour electric discharge lamp, containing mercury in addition to sodium, a sodium amalgam is formed and collects at the ends of the discharge tube, and in order that the required sodium vapour pressure shall be maintained during the operation of the lamp it is necessary for this amalgam to be maintained at a temperature of 750° C. to 800° C. In some cases a difficulty arises in that, as a result of prolonged operation of the lamp with the said end regions of the discharge tube maintained at the requisite high temperature, failure of the seals between the tube and the end closure members may occur.

It is an object of the present invention to provide a method of closing an open end of a tube composed of refractory oxide material, which method involves the use of an improved form of end closure member which is suitable for closing the end of a tubular envelope of an electric discharge device designed to be operated at a high temperature, such as an alkali metal vapour electric discharge lamp, and which closure member will make it possible for the end regions of the envelope as aforesaid to be maintained at the high temperature required with little risk of failure of the seal between the tube and the said closure member.

According to the invention, a method of closing an open end of a tube formed of a material composed of one or more refractory oxides includes the steps of inserting within the end of the tube a closure member which is formed of a refractory metal or alloy having a coefficient of thermal expansion closely matching that of the said refractory oxide material and which is in the form of a hollow cylinder closed at least at the inner end, fitting closely within the tube, and having at its outer end a flange which overlies at least the end surface of the tube wall, and hermetically sealing the said flange to the end of the tube.

The refractory metal employed for the construction of the cylindrical closure member may be any one of the metals tantalum, tungsten, molybdenum, rhenium, niobium, titanium, vanadium, zirconium, hafnium, or an alloy of two or more of these metals, provided that said metal or alloy has a suitable coefficient of thermal expansion as aforesaid. Niobium is preferred for use in closing tubes of material of high alumina content as hereinbefore defined, since the coefficient of thermal expansion of niobium closely matches that of such material. Close matching of the coefficients of thermal expansion of the materials of the tube and the cylinder is desirable, for facilitating sealing and for ensuring that the cylinder remains a close fit within the tube at all temperatures, and also, in cases where the temperature of the seal between the tube and the cylinder is appreciably raised during operation of the device of which the tube forms part, for rendering the said seal resistant to temperature cycling.

The flange at the outer end of the cylindrical closure member may be simply a radial flange abutting against, and sealed to, the end surface of the wall of the refractory oxide tube. Alternatively, if desired, the flange may consist of both a radial portion abutting against and sealed to the end surface of the tube wall, and a peripheral cylindrical portion fitting around, and sealed to, the outer surface of the tube wall, thus providing an increased sealing surface.

The sealing of the flange of the cylindrical closure member to the end of the tube of refractory oxide material may be effected by inserting a layer of any suitable bonding material between the flange and a portion of the tube surface against which it abuts, and heating the assembly to cause the bonding material to melt or sinter and bond the flange to the adjacent portion of the tube surface, in known manner. For example, the sealing material may be a glass, ceramic, or metal bonding medium having a coefficient of thermal expansion which closely matches those of the tube material and the metal of the closure member.

Where the tube is of high alumina content material and the closure member is formed of niobium, the sealing layer preferably consists of one or more of the metals titanium, zirconium, vanadium and hafnium, possibly with the addition of niobium and/or beryllium. In this case the sealing is effected by pressing the assembly of tube, sealing layer and flange together, and heating the assembly in an inert atmosphere (which term includes the use of a vacuum) to a temperature sufficiently high to cause metal from the sealing layer to alloy with niobium derived from the flange and produce an hermetic bonding of said flange to the end of the tube. The metallic sealing layer is conveniently introduced between the end surface of the tube and the flange in the form of one or more thin washers each composed of one of the said metals or of an alloy of two or more of these metals, a preferred sealing layer consisting of three thin washers respectively composed of zirconium, vanadium and titanium, of which preferably the titanium is placed adjacent to the alumina surface and the zirconium adjacent to the niobium surface. Where the sealing layer consists of two or more such washers of different composition, the heating step is carried out at a temperature such that the washers form an alloy which further alloys with niobium derived from the flange, so that alloying of the metals and formation of the seal are achieved in a single heating operation.

The tube end closure method of the invention is advantageous for use in the manufacture of any device including a tube of refractory oxide material, which tube is required to be closed at least at one end. The method is especially advantageous for the manufacture of electric discharge devices, for example metal vapour electric discharge lamps, which attain high temperatures in operation and which have tubular discharge envelopes of light-transmissive refractory oxide material, since the construction of the end closure member in accordance with the invention provides for the desired protection of the seal at the end of the tube from possible failure due to overheating.

Thus an electrode extending into the discharge envelope, along the tube axis, can readily be supported by the closed inner end of the cylindrical closure member, and in the case of a said lamp the filling metal, such as alkali metal amalgam, will be condensed in the vicinity of the said closed inner end of the cylinder, in contact with or close to the tubular envelope in this vicinity: the length of the electrode, measured from the said closed end of the cylinder, required for maintaining the filling metal at the desired temperature in operation of the lamp, in order to maintain the required vapour pressure of the metal, will therefore be the same as the length of an electrode, measured from an end cap or disc, required in a lamp of previously proposed construction with the same filling. Since the filling metal is removed from the seal at the outer end of the closure cylinder by a distance corresponding to the length of the cylinder, when the filling metal is heated to the required minimum temperature for maintaining the desired vapour pressure in operation the outer end of the tube adjacent to the seal will remain at a considerably lower temperature, depending on the length of the cylindrical closure member. Preferably the length of the cylindrical closure member inserted within the tube is such that, when the region of the tube inwards of, and in the vicinity of, the closed inner end of the cylinder is heated to the required operating temperature, the temperature of the seal at the outer end of the cylinder will not be raised to a significant extent above room temperature.

The method in accordance with the invention is particularly advantageous for alkali metal vapour electric discharge lamps having tubular discharge envelopes formed of light-transmissive high alumina content material as hereinbefore defined, the cylindrical closure member employed in such a case being formed of niobium, and the flange thereof preferably being sealed to the end of the alumina tube by the above-described method involving the use of a sealing layer consisting of one or more of the metals titanium, zirconium, vanadium, hafnium, possibly with niobium and/or beryllium: both the niobium closure member and the sealing layer, as well as the light-transmissive alumina, are highly resistant to attack by hot alkali metal vapour. In an alkali metal vapour electric discharge lamp, especially one designed for operation at a high filling pressure and high temperature, for obtaining a suitable reduction in the temperature of the envelope tube adjacent to the seal, the length of the cylindrical closure member, between the closed inner end thereof and the seal at the outer end, is preferably, but not essentially, at least substantially equal to the internal diameter of the envelope tube, and with advantage the length of the cylinder may be greater than the internal diameter of the tube.

Preferably the outer end of the cylindrical closure member is open, the closure member thus having the form of a thimble provided with a flange around the open end. Then, when the refractory oxide tube constitutes the discharge envelope of an electric discharge device, an electrically conducting member, such as a metal tag, rod or tube, can conveniently be inserted within the thimble and welded or brazed to the closed inner end thereof, in order to provide means for connecting an electrode supported by the other side of the said inner end of the thimble to an electric current supply. However, if desired, the outer end of the cylinder can be closed, a conducting tag or other member then being attached to the closed outer end if required.

The end closure method in accordance with the invention is especially suitable for use with a tube formed of sintered polycrystalline alumina, with or without minor additions of other refractory oxides such as magnesia: this material, in light-transmissive form, is preferred for use for the discharge envelopes of alkali metal vapour electric discharge lamps. However, the tube may be composed of other forms of alumina, for example it may be formed substantially from a single crystal of alumina or it may consist of crystalline alumina deposited from the vapour phase.

Preferably both ends of a tube of refractory oxide material are closed by means of cylindrical closure members in accordance with the invention, and in the case of an electric discharge device having a tubular discharge envelope formed of the said material, both said closure members support electrodes disposed along the axis of the tube.

One specific form of electric discharge device comprising a tubular discharge envelope closed at both ends by means of cylindrical closure members, in accordance with the invention, will now be described by way of example, with reference to the accompanying drawing.

The device of the example is a high pressure sodium vapour electric discharge lamp having a tubular discharge envelope formed of light-transmissive sintered ceramic alumina containing 1% by weight of magnesia. Referring to the drawing, which shows the lamp diagrammatically in part-sectional elevation, the discharge envelope 1 is a straight tube approximately 120 millimetres long and having an internal diameter of 7 millimetres, with a wall thickness of 0.8 mm. Closure members in the form of thimbles 2, 3, having radial flanges 4, 5, and formed from niobium sheet 0.007 inch thick, are inserted into the ends of the tube 1, the flanges 4, 5 being sealed to the ends of the tube in a manner to be described below: in the drawing the thimbles are shown in position ready for sealing but not actually sealed to the ends of the alumina tube, in order that the sealing step may be clearly explained with reference to the drawing. The thimbles are substantially 7 mm. in external diameter, so as to be a close fit within the tube 1, and are 8 mm. long.

An electrode 6, in the form of a silicated tungsten rod 15 mm. long and 1.2 mm. in diameter, on which is wound a coil of tungsten wire 7, retaining a quantity of activating material 8, is brazed to the closed inner end of the niobium thimble 2 by means of titanium, as shown at 9, so that the said electrode is supported coaxially within the envelope 1. A niobium tag 10 is brazed to the exterior side of the closed inner end of the niobium thimble 2, also with titanium, as shown at 11.

The second electrode of the lamp is supported by the other niobium thimble 3; this electrode consists of a similar silicated tungsten rod 12, 12 mm. long and overwound with a coil of tungsten wire 13, and is brazed with titanium to a molybdenum rod 14, a length of 3 mm. of which lies within the envelope and which extends through an aperture in the centre of the closed inner end of the thimble 3, and widens to form a shoulder 15, which is brazed to the exterior side of the closed inner end of the thimble 3 with titanium, at 16. An exhaust tube 17 of titanium or niobium is fitted over the external end of the molybdenum rod 14, and is brazed thereto as shown at 18 by means of titanium in the case of a niobium tube, or zirconium and vanadium washers in the case of a titanium tube. The molybdenum rod 14 has a narrow duct 19 extending through it from the outer end and terminating at the side of the rod within the envelope, at 20; this duct serves as a pumping stem for evacuating the envelope and introducing the filling into it during manufacture of the lamp.

In manufacturing the lamp shown in the drawing, the thimble-electrode assemblies are first completed, as described above, including the attachment of the tube 17, the brazing operations all being carried out in vacuum or in an inert gas atmosphere. Three metal sealing washers are then placed over each thimble, so as to lie on the respective flanges, as shown in the drawing. The washers 21, 21' are of zirconium and are 0.004 inch thick, the washers 22, 22' are of vanadium of thickness 0.0015 inch, and the washers 23, 23' are of titanium, 0.002 inch thick. All the washers have internal and external diameters of 7 mm. and 9 mm. respectively. The washer assemblies are spot-welded to the respective flanges and the thimble-electrode assemblies are then inserted into the respective ends of the alumina tube 1, with the sealing washers in the positions shown in the drawing, between the said flanges and the ends of the tube, and the whole assembly is heated in vacuum or in argon while pressure is applied to the thimble flanges and sealing washers by supporting the assembly vertically and placing a weight of 3.5 kgms. on the upper flange, the assembly being raised from room temperature to 1400° C.±50° C. in approximately ten minutes and then being allowed to cool. During the heating the washer assemblies form an alloy of the composition of 68% zirconium, 14% vanadium, 18% titanium, by weight, which further alloys with the niobium of the flanges 4, 5, and bonds the flanges firmly to the ends of the alumina tube 1.

The envelope is then evacuated, and a filling of sodium, mercury, and rare gas, for example argon at a pressure of about 20 millimetres of mercury, is introduced into the envelope 1, through the tube 17 and duct 19, and the tube 17 is then sealed off by pinching and arc welding in argon.

The lamp shown in the drawing is mounted coaxially within a cylindrical glass outer jacket designed to maintain the envelope 1 at a suitable high operating temperature when the lamp is in use, and electric current supply leads are connected to the lamp by being attached to the niobium tag 10 and the metal tube 17 respectively. The outer jacket and the leads are both of well known form, and have therefore been omitted from the drawing.

As a result of the operation and subsequent cooling of the lamp described above with reference to the drawing, the excess filling metal in the form of a sodium amalgam, collects in the vicinity of the closed ends of the thimbles 2, 3, as shown at 24, and is thus sufficiently far removed from the seals at the ends of the tube 1, to ensure that, when the amalgam is heated in operation of the lamp to the requisite temperature for maintaining the desired vapour pressure of sodium, the seals remain at a relatively low temperature.

We claim:
1. A sodium vapour electric discharge lamp comprising a tubular discharge envelope formed of light-transmissive sintered polycrystalline alumina, wherein each end of said envelope is closed by a closure member composed of niobium and in the form of a hollow cylinder inserted within the envelope tube, which cylinder is of length not less than the internal diameter of the envelope tube, is a close fit within the tube but is not sealed to the interior surface of the tube, is closed at its inner end and open at its outer end, and has at its outer end a radial flange which is wholly external to the tube and abuts against the end surface of the tube wall and is hermetically sealed thereto by means of an alloy consisting of niobium, titanium, vanadium and zirconium in which the proportions of zirconium, titanium and vanadium relative to each other are respectively, substantially 68, 18 and 14 parts by weight, wherein an electrode extending into the envelope along the tube axis is supported by the closed inner end of each said cylindrical closure member, and wherein an electrically conducting member is inserted within, and attached to the closed inner end of, the cylinder of each said closure member, one of said electrically conducting members also constituting the exhaust tube of the lamp.

References Cited

UNITED STATES PATENTS

| 2,491,631 | 12/1949 | Wall et al. | 313—220 X |
| 2,971,110 | 2/1961 | Schmidt | 313—221 |
| 3,243,635 | 3/1966 | Louden et al. | 313—220 X |

FOREIGN PATENTS 1,351,331  12/1963  France.

OTHER REFERENCES

Kohl: "Materials and Techniques for Electron Tubes," 1960, pp. 493–500.

ROBERT SEGAL, *Primary Examiner.*

R. F. HOSSFELD, *Assistant Examiner.*

U.S. Cl. X.R.

174—50.63; 313—317